US008863070B2

(12) United States Patent
Matsushita (10) Patent No.: US 8,863,070 B2
(45) Date of Patent: Oct. 14, 2014

(54) THERMAL-ANALYSIS-MODEL GENERATING APPARATUS, NON-TRANSITORY COMPUTER-READABLE STORAGE MEDIUM, THERMAL-ANALYSIS-MODEL GENERATING METHOD, AND THERMAL ANALYSIS APPARATUS

(75) Inventor: Hideharu Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 577 days.

(21) Appl. No.: 13/219,020

(22) Filed: Aug. 26, 2011

(65) Prior Publication Data
US 2012/0072161 A1    Mar. 22, 2012

(30) Foreign Application Priority Data

Sep. 16, 2010    (JP) ................................ 2010-208464

(51) Int. Cl.
G06F 17/50    (2006.01)
(52) U.S. Cl.
CPC ........ *G06F 17/5009* (2013.01); *G06F 2217/80* (2013.01)
USPC ............................. 716/137; 716/135; 716/136
(58) Field of Classification Search
CPC ............ G06F 2217/80; G06F 17/5068; G06F 17/5081
USPC ......................................... 716/135, 136, 137
See application file for complete search history.

(56) References Cited

U.S. PATENT DOCUMENTS

| 7,805,689 | B2 | 9/2010 | Ueda et al. | |
|---|---|---|---|---|
| 2008/0082947 | A1* | 4/2008 | Ueda et al. | ......................... 716/8 |
| 2010/0138799 | A1 | 6/2010 | Matsushita et al. | |
| 2013/0212550 | A1* | 8/2013 | Christo et al. | ................. 716/133 |

FOREIGN PATENT DOCUMENTS

| JP | 11-066122 | 3/1999 |
|---|---|---|
| JP | 2004-227337 | 8/2004 |
| JP | 2008-090522 | 4/2008 |
| JP | 2008-157746 | 7/2008 |
| JP | 2010-134497 | 6/2010 |

OTHER PUBLICATIONS

Translation of Office Action (hereinabove "JPOA") mailed by Japan Patent Office on Jan. 21, 2014, in connection with foreign priority Japanese Patent Application No. 2010-208464.
Naoki Kunimine,"An Introduction to Thermal Fluid Analysis on Electronic Equipment", 1st ed., Nikkan Kogyo Shimbun Ltd., Sep. 30, 2009, pp. 87-89.
Hideyuki Takahara "Optoelectronic Multichip Module Substrate Technology", Journal of Japan Institute of Electronics Packaging, Aug. 1, 2002, vol. 5, No. 5, pp. 455-458.

* cited by examiner

*Primary Examiner* — Paul Dinh
(74) *Attorney, Agent, or Firm* — Fujitsu Patent Center (57)    ABSTRACT

A thermal analysis apparatus calculates an area of a predetermined range including an electronic component mounted on a printed-circuit board. The thermal analysis apparatus counts the number of via holes included in the predetermined range of which the area is calculated. The thermal analysis apparatus calculates a first physical property value using the area calculated, the number of via holes counted, and a preset physical property value of a conductor. The thermal analysis apparatus generates a thermal analysis model subject to thermal analysis in which a preset physical property value is set in the electronic component and a heat release path having the first physical property value calculated is provided in the printed-circuit board so as to extend from the electronic component in a layer direction of the printed-circuit board.

11 Claims, 8 Drawing Sheets

THERMAL-ANALYSIS-MODEL GENERATING APPARATUS, NON-TRANSITORY COMPUTER-READABLE STORAGE MEDIUM, THERMAL-ANALYSIS-MODEL GENERATING METHOD, AND THERMAL ANALYSIS APPARATUS

CROSS-REFERENCE TO RELATED APPLICATION

This application is based upon and claims the benefit of priority of the prior Japanese Patent Application No. 2010-208464, filed on Sep. 16, 2010, the entire contents of which are incorporated herein by reference.

FIELD

The embodiments discussed herein are directed to a thermal-analysis-model generating apparatus, a thermal-analysis-model generating program, a thermal-analysis-model generating method, and a thermal analysis apparatus.

BACKGROUND

In recent years, electronic devices are becoming highly-integrated, sophisticated, and miniaturized. There has been promoted thermal analysis for estimating or confirming the effect of heat release by using a thermal analysis model that a heat releasing (heat generating) condition of a printed-circuit board or an electronic component mounted on the printed-circuit board, etc. in such an electronic device is modeled.

For example, there is known a thermal analysis model for calculating a physical property value of a printed-circuit board by using the number of wiring layers (the number of layers) of the printed-circuit board, the thickness of wiring layers of the printed-circuit board, an area ratio (an occupancy rate) of a wiring pattern to the printed-circuit board, and the thickness of the entire printed-circuit board as parameters. Specifically, two components: an effective thermal conductivity of the printed-circuit board in a horizontal direction (a plane direction) and an effective thermal conductivity of the printed-circuit board in a vertical direction (a layer direction) are calculated as physical property values.

As an example, when an area of the printed-circuit board on which electronic component(s) can be mounted is denoted by S [$m^2$] and copper foil (wiring information) is denoted by Cu [$m^2$], a residual rate of copper foil is Cu/S (%). As a result of generation of this thermal analysis model, a physical property value can be expressed by "equivalent thermal conductivity=thermal conductivity of copper×(Cu/S)".

Figure 12:
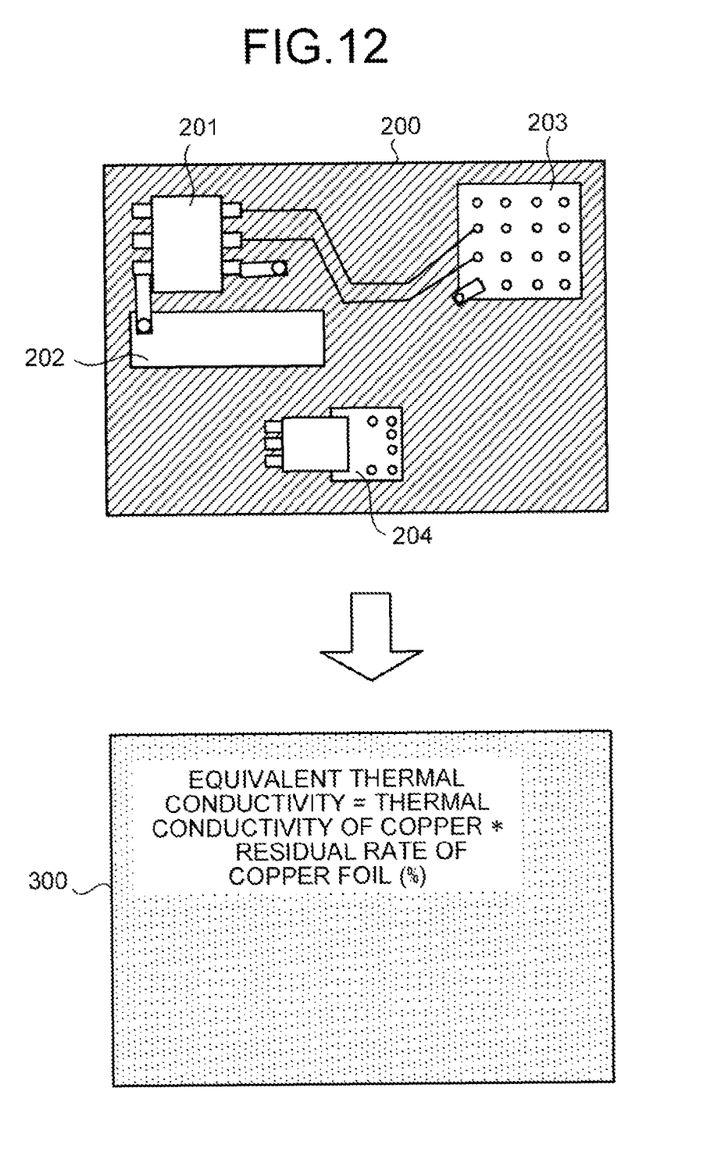
FIG. 12 is a diagram for explaining thermal analysis modeling.

A concrete example is described with reference to FIG. 12. FIG. 12 is a diagram for explaining thermal analysis modeling. A printed-circuit board 200 illustrated in FIG. 12 includes an electronic component 201, a pattern 202, an electronic component 203, and an electronic component 204. When a thermal analysis model is generated from the printed-circuit board 200 by the technique described above, it is modeled as one conductor 300 having an "equivalent thermal conductivity" as illustrated in FIG. 12.

Furthermore, there is known a thermal analysis model for dividing a printed-circuit board into arbitrary grids, calculating an area ratio of copper foil in each grid, and calculating a thermal conductivity of each grid. In this technique, if thermal conductivities of adjacent grids are an equal value, the grids are integrated, thereby preventing the thermal analysis model from being large in scale.

Patent document 1: Japanese Laid-open Patent Publication No. 11-066122
Patent document 2: Japanese Laid-open Patent Publication No. 2010-134497

However, there is a problem that thermal analysis using a physical property value calculated based on a conventional thermal analysis model is low in accuracy of analysis. For example, a thermal conductivity calculated as a physical property value based on the conventional thermal analysis model is an average value of an entire printed-circuit board. However, in an actual printed-circuit board, a thermal conductivity is not constant, and different thermal conductivities are distributed locally. Therefore, even if thermal analysis is conducted using the average thermal conductivity of the entire printed-circuit board, the accuracy of analysis is not high.

Furthermore, the accuracy of analysis may be increased by reducing the size of grids into which the printed-circuit board is divided; however, in this case, as the size of grids gets smaller, a larger-scale thermal analysis model is generated and therefore it takes a longer time to analyze in the thermal analysis, so it is not practical.

SUMMARY

According to an aspect of an embodiment of the invention, a thermal-analysis-model generating apparatus includes an area calculating unit that calculates an area of a predetermined range including an electronic component mounted on a printed-circuit board; a counting unit that counts the number of via holes included in the predetermined range of which the area is calculated by the area calculating unit; a first calculating unit that calculates a first physical property value using the area calculated by the area calculating unit, the number of via holes counted by the counting unit, and a preset physical property value of a conductor; and a model generating unit that generates a thermal analysis model subject to thermal analysis in which a preset physical property value is set in the electronic component and a heat release path having the first physical property value calculated by the first calculating unit is provided in the printed-circuit board so as to extend from the electronic component in a layer direction of the printed-circuit board.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. Incidentally, the present invention is not limited to the embodiments.

[a] First Embodiment

Figure 1:
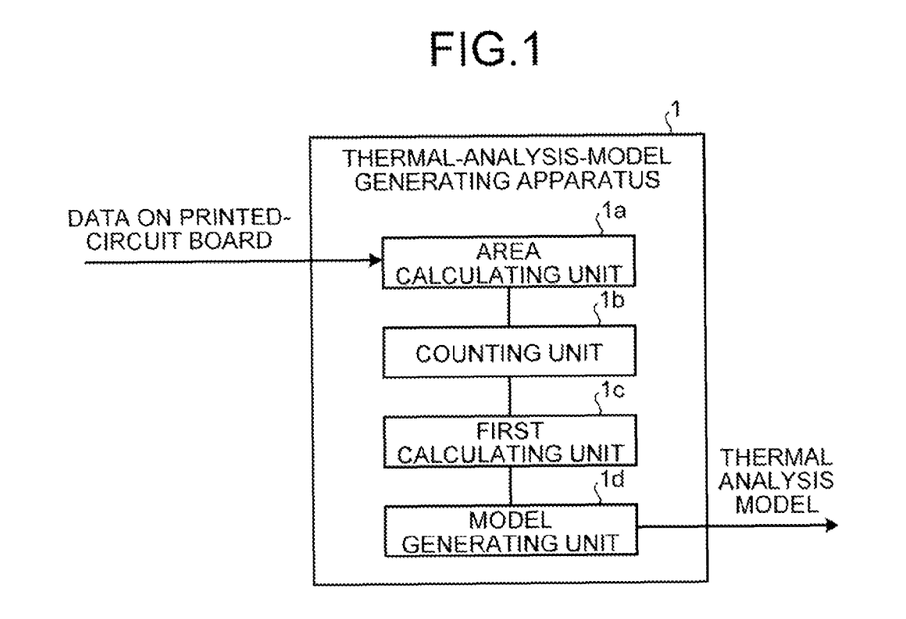
FIG. 1 is a block diagram illustrating a configuration of a thermal-analysis-model generating apparatus according to a first embodiment.

FIG. 1 is a block diagram illustrating a configuration of a thermal-analysis-model generating apparatus according to a first embodiment. A thermal-analysis-model generating apparatus 1 illustrated in FIG. 1 is a computer which generates a thermal analysis model subject to analysis in thermal analysis for simulating a heat releasing condition of a printed-circuit board from various information of the printed-circuit board generated by a computer aided design (CAD) or the like. As illustrated in FIG. 1, this thermal-analysis-model generating apparatus 1 includes an area calculating unit 1a, a counting unit 1b, a first calculating unit 1c, and a model generating unit 1d.

The area calculating unit 1a calculates an area of a predetermined range including an electronic component mounted on the printed-circuit board. The counting unit 1b counts the number of via holes included in the predetermined range of which the area is calculated by the area calculating unit 1a. The first calculating unit 1c calculates a first physical property value using the area calculated by the area calculating unit 1a, the number of via holes counted by the counting unit 1b, and a preset physical property value of a conductor. The model generating unit 1d generates a thermal analysis model subject to thermal analysis in which a preset physical property value is set in an electronic component and a heat release path having the first physical property value calculated by the first calculating unit 1c is provided in the printed-circuit board so as to extend from the electronic component in a layer direction of the printed-circuit board.

Then, the thermal-analysis-model generating apparatus 1 outputs the thermal analysis model generated in this way to a thermal analysis apparatus. After that, the thermal analysis apparatus executes thermal analysis using the thermal analysis model. As a result, the accuracy of thermal analysis can be improved.

Namely, the thermal-analysis-model generating apparatus 1 according to the first embodiment generates a thermal analysis model with which how far down heat is released from an electronic component can be simulated not by using an average thermal conductivity in a printed-circuit board but by providing a heat release path in the printed-circuit board so as to extend from each electronic component in the layer direction of the printed-circuit board. Therefore, in thermal analysis using the thermal analysis model generated by the thermal-analysis-model generating apparatus 1 according to the first embodiment, the flow of released heat can be analyzed.

[b] Second Embodiment

Figure 2:
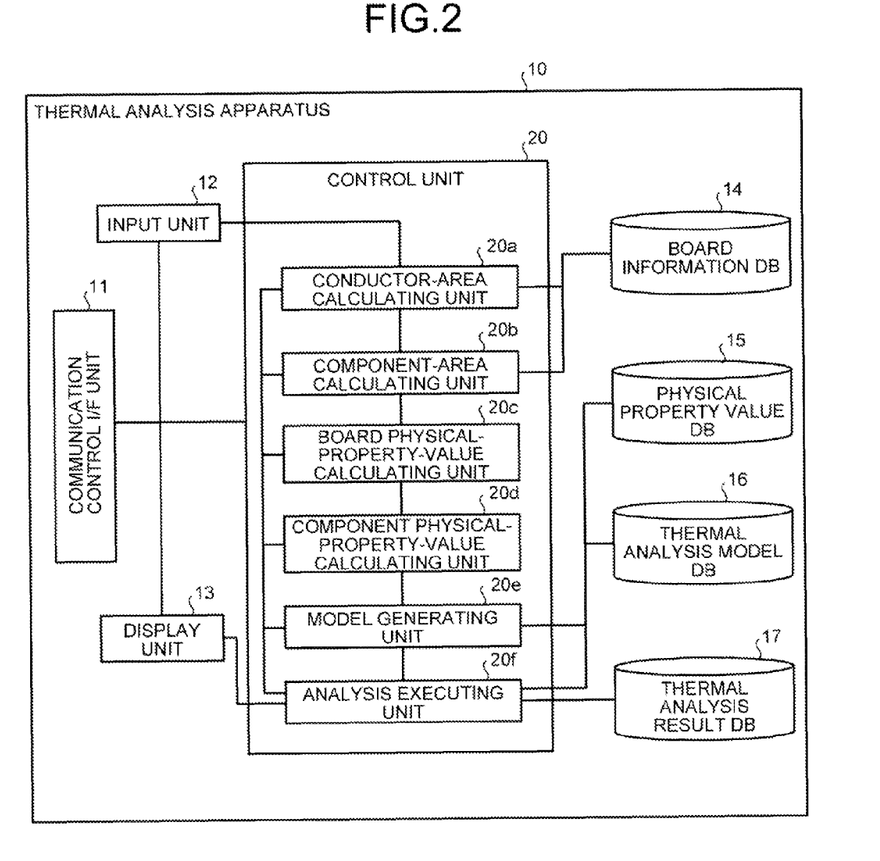
FIG. 2 is a block diagram illustrating a configuration of a thermal analysis apparatus according to a second embodiment.

Subsequently, a thermal analysis apparatus according to a second embodiment is explained. FIG. 2 is a block diagram illustrating a configuration of the thermal analysis apparatus according to the second embodiment. A thermal analysis apparatus 10 illustrated in FIG. 2 is a computer which generates thermal analysis for simulating a heat releasing condition of a printed-circuit board from various information of the printed-circuit board generated by a CAD or the like and executes thermal analysis using the generated thermal analysis model.

This thermal analysis apparatus 10 includes a communication control I/F unit 11, an input unit 12, a display unit 13, a board information database (DB) 14, a physical property value DB 15, a thermal analysis model DB 16, a thermal analysis result DB 17, and a control unit 20. The board information DB 14, the physical property value DB 15, the thermal analysis model DB 16, and the thermal analysis result DB 17 are, for example, a storage device, such as a semiconductor memory element or a hard disk. Incidentally, these DBs need not be included in the thermal analysis apparatus 10; alternatively, these DBs can be provided outside the thermal analysis apparatus 10 and connected to the thermal analysis apparatus 10 via the communication control I/F unit 11.

The communication control I/F unit 11 is an interface for controlling communications with other devices; data is transmitted/received to/from other devices via the communication control I/F unit 11. The input unit 12 is, for example, a keyboard and a mouse, etc.; the input unit 12 receives input from an administrator or the like, such as an instruction to start thermal analysis, and outputs the input instruction to the control unit 20. The display unit 13 is, for example, a monitor and a display, etc.; the display unit 13 displays or outputs an image or sound of a thermal analysis model generated by the thermal analysis apparatus 10 or a result of thermal analysis.

The board information DB 14 stores therein board information of a printed-circuit board subject to thermal analysis, component information, wiring information, information on a power network and a ground network, etc., and the like in the form of CAD data or the like. For example, the board information DB 14 stores therein, as board information, information on "the shape of a board, the size of the board, and the thickness of the board" and a configuration of layers, such as "the number of layers, the material of each layer, the thickness of a copper foil layer, and a distance between layers". Furthermore, the board information DB 14 stores therein, as component information of each electronic component mounted on a printed-circuit board, information on "the size of an electronic component, the position at which the electronic component is mounted, a type of the electronic component, an amount of heat generation, consumed power, and the number of via holes connected". For example, component types include LSI (large scale integration), BGA (ball grid array), transistor, and the like. Furthermore, the "size" is expressed in "length×width×height (thickness)".

Moreover, the board information DB 14 stores therein, as wiring information, wiring pattern information and via hole information. Specifically, the board information DB 14 stores therein the thickness of wiring, a wiring layer, and a pattern layer, such as the thickness of a copper foil layer, as wiring information. Furthermore, the board information DB 14 stores therein, as via hole information, the position of wiring, a connection layer (a start layer, an end layer), and the size.

Incidentally, the board information DB 14 can store therein information on a plurality of printed-circuit boards. For example, by adding information for uniquely identifying a printed-circuit board, such as an identifier or model number of the board, to each of the information, the board information DB 14 can store therein board information, component information, wiring information, and information on a power network and a ground network, etc. with respect to each printed-circuit board.

The physical property value DB 15 stores therein a physical property value of each electronic component mounted on a printed-circuit board subject to thermal analysis. For example, the physical property value DB 15 stores therein a thermal conductivity as a physical property value to be associated with each electronic component.

The thermal analysis model DB 16 stores therein a thermal analysis model generated by a model generating unit 20e to be described later with respect to each printed-circuit board subject to thermal analysis. The thermal analysis result DB 17 stores therein a result of thermal analysis executed by an analysis executing unit 20f to be described later with respect to each printed-circuit board subject to thermal analysis.

The control unit 20 is an electronic circuit such as a central processing unit (CPU) having an internal memory for storing a control program, such as an operating system (OS), programs defining various processing procedures, and data. The control unit 20 includes a conductor-area calculating unit 20a, a component-area calculating unit 20b, a board physical-property-value calculating unit 20c, a component physical-property-value calculating unit 20d, the model generating unit 20e, and the analysis executing unit 20f.

The conductor-area calculating unit 20a calculates an area of a conductor in a printed-circuit board. For example, when instructed to start thermal analysis through the input unit 12, the conductor-area calculating unit 20a obtains board information of an instructed printed-circuit board from the board information DB 14. As an example, the conductor-area calculating unit 20a obtains the size of the printed-circuit board, a configuration of layers, the size of each layer, wiring pattern information, and the like from the board information DB 14, and calculates an area of a wiring pattern on a layer-by-layer basis. Then, the conductor-area calculating unit 20a calculates an area "A (m$^2$)" of a conductor included in the printed-circuit board by adding up the calculated areas of the conductor in the respective layers. After that, the conductor-area calculating unit 20a outputs the area "A (m$^2$)" of the conductor to the component-area calculating unit 20b.

The component-area calculating unit 20b calculates an area of a predetermined range including an electronic component mounted on the printed-circuit board and a via hole connected to the electronic component, and counts the number of via holes included in the predetermined range. For example, the component-area calculating unit 20b receives the area "A (m$^2$)" of the conductor from the conductor-area calculating unit 20a. Then, the component-area calculating unit 20b identifies "component X, component Y" as electronic components mounted on the printed-circuit board from the board information DB 14. Then, the component-area calculating unit 20b identifies "1" as the number of via holes that the identified electronic component "component X" has or the number of via holes connected to the "component X". In the same way, the component-area calculating unit 20b identifies "2" as the number of via holes that the identified electronic component "component Y" has or the number of via holes connected to the "component Y" from the board information DB 14.

Then, the component-area calculating unit 20b calculates an area of a predetermined range including the identified electronic component. For example, the component-area calculating unit 20b receives specification of a range surrounding the electronic component from a user through the input unit 12. Then, the component-area calculating unit 20b calculates an area of the range specified by the user. As an example, the component-area calculating unit 20b receives specification of a range through CAD data stored in the board information DB 14. Then, the component-area calculating unit 20b converts the specified range into coordinates used in the CAD data or the like, and calculates an area of the specified range by using the converted coordinates or the like. Incidentally, the component-area calculating unit 20b can be configured to receive specification of a range of each electronic component from a user, and the specified range can be stored in the board information DB 14 in advance.

Here, it is assumed that the component-area calculating unit 20b has calculated an area including the electronic component "component X" is "X (m$^2$)" and an area including the electronic component "component Y" is "Y (m$^2$)". After that, the component-area calculating unit 20b outputs "A (m$^2$)", the area of the conductor, and "component X, X (m$^2$), number of via holes=1" and "component Y, Y (m$^2$), number of via holes=2", information on the electronic components, to the board physical-property-value calculating unit 20c and the component physical-property-value calculating unit 20d. Furthermore, the component-area calculating unit 20b also outputs the above information to the model generating unit 20e.

The board physical-property-value calculating unit 20c calculates a physical property value for board by using a ratio of an area obtained by excluding the area calculated by the component-area calculating unit 20b from the area of the conductor calculated by the conductor-area calculating unit 20a in the printed-circuit board. For example, the board physical-property-value calculating unit 20c adds up the area "X (m$^2$)" of the component X and area "Y (m$^2$)" of the component Y received from the component-area calculating unit 20b, and calculates the total area "X+Y (m$^2$)" of the electronic components mounted on the printed-circuit board. Then, the board physical-property-value calculating unit 20c divides the total area "X+Y (m$^2$)" of the electronic components by the area "A (m$^2$)" of the conductor ((X+Y)/A).

After that, the board physical-property-value calculating unit 20c substitutes the obtained value into a residual rate of copper foil in equation (1), and calculates an equivalent thermal conductivity (W/(m·K)) which is a physical property value of the conductor except for the electronic components in the entire printed-circuit board. Namely, with a conductor layer of the printed-circuit board except for the electronic components as one block, the board physical-property-value calculating unit 20c calculates a thermal conductivity of the block. In other words, the equivalent thermal conductivity calculated here is an effective thermal conductivity in a horizontal direction (a plane direction) of the printed-circuit board. However, in specific heat and the density in equation (1), a physical property value (a thermal conductivity) of copper is used. Incidentally, the board physical-property-value calculating unit 20c outputs the calculated equivalent thermal conductivity to the model generating unit 20e.

$$\text{Equivalent thermal conductivity} = \text{conductivity of copper} \times \text{copper-foil residual rate} \quad (1)$$

The component physical-property-value calculating unit 20d calculates a physical property value for each electronic component by using the area and the number of via holes which have been calculated by the component-area calculating unit 20b. For example, it is assumed that the component physical-property-value calculating unit 20d has received "A ($m^2$)", the area of the conductor, and "component X, X ($m^2$), number of via holes=1" and "component Y, Y ($m^2$), number of via holes=2", information on the electronic components, from the component-area calculating unit 20b. In this case, the component physical-property-value calculating unit 20d substitutes "X ($m^2$)" into "area of wiring pattern" in equation (2) and substitutes "1" into "number of via holes", and calculates a thermal conductivity X as a physical property value corresponding to a predetermined range including the electronic component X.

Furthermore, the component physical-property-value calculating unit 20d substitutes "Y ($m^2$)" into "area of wiring pattern" in equation (2) and substitutes "2" into "number of via holes", and calculates a thermal conductivity Y as a physical property value corresponding to a predetermined range including the electronic component Y. Namely, the thermal conductivity of each electronic component calculated here is an effective thermal conductivity in a vertical direction (a layer direction) of the printed-circuit board. Incidentally, the component physical-property-value calculating unit 20d outputs the calculated thermal conductivity of each electronic component to the model generating unit 20e.

$$\text{Thermal conductivity} = (\text{area of wiring pattern} \times \text{coefficient 1} + \text{number of via holes} \times \text{coefficient 2}) \times \text{copper thermal conductivity (specific heat and the density are a physical property value of copper)} \quad (2)$$

However, in specific heat and the density in equation (2), a physical property value (a thermal conductivity) of copper is used. Furthermore, the coefficients 1 and 2 in equation (2) are each uniquely determined by a manufacturing process of a printed-circuit board, a material of the printed-circuit board, a material of an electronic component mounted on the printed-circuit board, a type of the electronic component, and the like.

The model generating unit 20e generates a thermal analysis model subject to thermal analysis. For example, the model generating unit 20e generates a thermal analysis model in which a thermal conductivity for board is assigned to a conductor other than an electronic component, a pre-specified thermal conductivity is assigned to the electronic component, and a pre-specified thermal conductivity is assigned to an insulator. Furthermore, the model generating unit 20e provides a via hole in the thermal analysis model as a heat release path having the thermal conductivity calculated by the component physical-property-value calculating unit 20d in the printed-circuit board so as to extend from the electronic component in the layer direction of the printed-circuit board.

As an example, the model generating unit 20e identifies electronic components mounted on the printed-circuit board and the positions at which the electronic components are mounted from the board information DB 14, and identifies a configuration of the entire printed-circuit board. Here, it is assumed that electronic components mounted on the printed-circuit board are the component X and the component Y.

Then, the model generating unit 20e sets the thermal conductivity calculated by the board physical-property-value calculating unit 20c as a physical property value of a conductor part other than the electronic components in the printed-circuit board. Furthermore, the model generating unit 20e sets a preset thermal conductivity, such as a thermal conductivity of epoxy, as a physical property value of an insulator part in the printed-circuit board. Then, the model generating unit 20e provides a via hole having the thermal conductivity X in the printed-circuit board so as to extend from the center of the component X in the layer direction of the printed-circuit board. Furthermore, the model generating unit 20e sets up a via hole having the thermal conductivity Y in the center of the component Y so as to extend in the layer direction of the printed-circuit board.

Furthermore, the model generating unit 20e forms each electronic component in the printed-circuit board into a rectangular shape and shapes it into a block in accordance with the height, and identifies a physical property value corresponding to the electronic component from the physical property value DB 15 and sets the identified physical property value. Then, the model generating unit 20e moves the conductor layer that the printed-circuit board has in a direction of the center of the printed-circuit board, i.e., a thickness direction by a distance equal to the resist thickness.

The model generating unit 20e generates a thermal analysis model of the printed-circuit board subject to thermal analysis in this way. Namely, the model generating unit 20e sets the thermal conductivity calculated by the board physical-property-value calculating unit 20c in the conductor layer in the printed-circuit board, and sets a thermal conductivity of epoxy or the like in the insulation layer. Furthermore, the model generating unit 20e sets a thermal conductivity corresponding to each electronic component to the electronic component, and sets up a via hole having the thermal conductivity calculated by the component physical-property-value calculating unit 20d in the center of the electronic component so as to extend in the layer direction. Moreover, the model generating unit 20e generates a thermal analysis model in which the conductor layer is moved in a direction of the center of the printed-circuit board by a distance equal to the resist thickness.

After that, the model generating unit 20e stores the generated thermal analysis model and information identifying the printed-circuit board in the thermal analysis model DB 16 in an associated manner, and outputs notification that the thermal analysis model has been generated to the analysis executing unit 20f.

The analysis executing unit 20f executes thermal analysis of the thermal analysis model generated by the model generating unit 20e. For example, when receiving the notification that the thermal analysis model has been generated from the model generating unit 20e, the analysis executing unit 20f obtains a target thermal analysis model from the thermal analysis model DB 16. As an example, by receiving information identifying the printed-circuit board from the model generating unit 20e, the analysis executing unit 20f can identify the printed-circuit board.

Then, the analysis executing unit 20f executes thermal analysis for simulating a heat generation condition and a heat release path, etc. in the printed-circuit board with respect to the obtained thermal analysis model. Then, the analysis executing unit 20f displays a state of the analysis on the display unit 13. After that, the analysis executing unit 20f stores the information identifying the printed-circuit board and a result of the thermal analysis in the thermal analysis result DB 17 in an associated manner.

Concrete Example of Thermal Analysis Model

Figure 3:
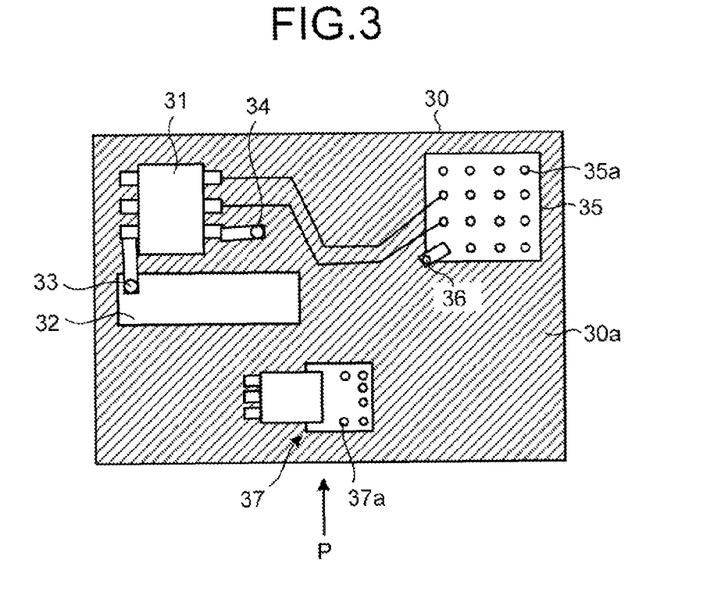
FIG. 3 is a diagram illustrating an example of a printed-circuit board subject to thermal analysis.
Figure 4:
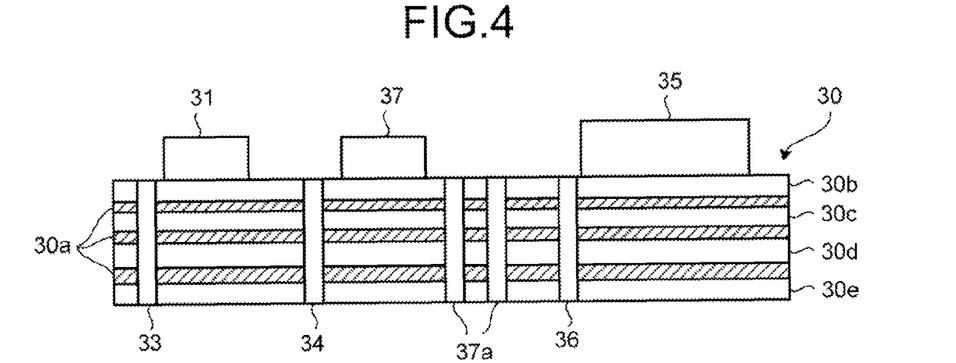
FIG. 4 is a cross-sectional view of the printed-circuit board subject to the thermal analysis.
Figure 5:
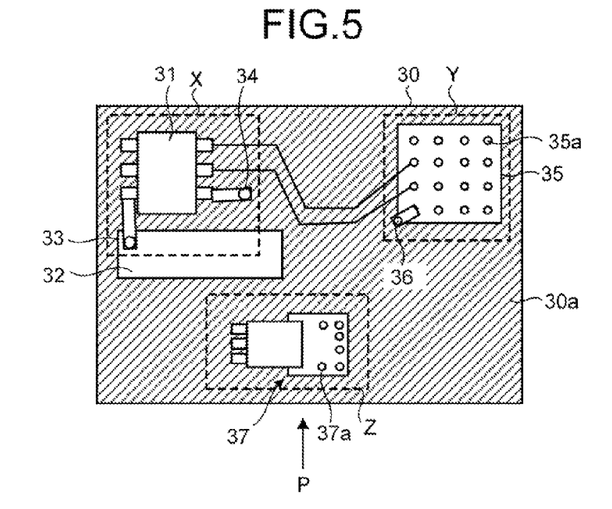
FIG. 5 is a diagram illustrating an example of a predetermined area including an electronic component.
Figure 6:
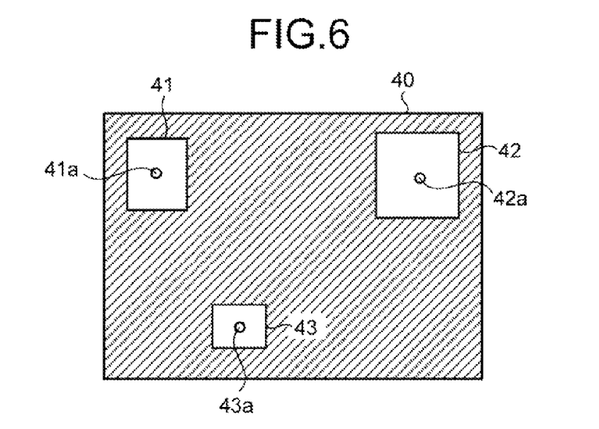
FIG. 6 is a diagram illustrating an example of a thermal analysis model of the printed-circuit board.
Figure 7:
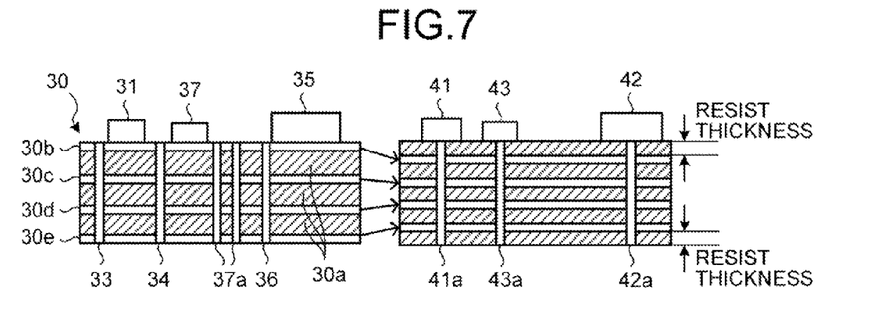
FIG. 7 is a diagram illustrating an example where the position of a conductor layer is moved by a distance equal to the resist thickness.

Subsequently, a concrete example of the thermal analysis model is explained with reference to FIGS. 3 to 7. FIG. 3 is a diagram illustrating an example of a printed-circuit board subject to thermal analysis. FIG. 4 is a cross-sectional view of the printed-circuit board subject to thermal analysis. FIG. 5 is a diagram illustrating an example of a predetermined area including an electronic component. FIG. 6 is a diagram illustrating an example of a thermal analysis model of the printed-circuit board. FIG. 7 is a diagram illustrating an example where the position of a conductor layer is moved by a distance equal to the resist thickness.

The board information DB 14 of the thermal analysis apparatus 10 stores therein board information on the printed-circuit board illustrated in FIGS. 3 and 4. Specifically, a printed-circuit board 30 illustrated in FIG. 3 includes an LSI 31, a pattern 32, an LSI 35, and an LSI 37 on the surface, which is an insulation layer 30a, thereof. Incidentally, here, there is illustrated an example where the printed-circuit board 30 includes electronic components on one side thereof; however, the configuration of the printed-circuit board 30 is not limited to this, and the printed-circuit board 30 can include electronic components on both sides.

The LSI 31 is an electronic component which generates heat, and is connected to a via hole 34 and a via hole 33 in the pattern. The pattern 32 is a conductor pattern connecting between electronic components wired to the surface or inside of the printed-circuit board 30. The pattern 32 has the via hole 33. The LSI 35 is an electronic component which has a plurality of BGAs 35a and generates heat. The LSI 35 is connected to a via hole 36. The LSI 37 is an electronic component, such as a transistor, which has a plurality of via holes 37a and generates a high amount of heat.

FIG. 4 is a cross-sectional view of the printed-circuit board illustrated in FIG. 3 as viewed from a direction P. As illustrated in FIG. 4, the printed-circuit board 30 has a layer configuration consisting of a conductor layer, which is formed of a resist 30b, a ground layer 30c, a power layer 30d, and a registry 30e, and the insulation layer 30a on which electronic components and the like are mounted.

Therefore, the board information DB 14 of the thermal analysis apparatus 10 stores therein information on the via holes that the printed-circuit board 30 has, the electronic components mounted on the printed-circuit board 30, a relation of connection between the via holes and the electronic components, the layer configuration, and the like in the form of CAD data. Namely, the board information DB 14 stores therein the size of the printed-circuit board, the positions of the electronic components, the sizes of the layers, layout of the layers, and the like which are converted into numerical data, such as coordinates. The physical property value DB 15 of the thermal analysis apparatus 10 stores therein respective physical property values of the LSI 31, LSI 35, and LSI 37 illustrated in FIG. 3.

In such conditions, the conductor-area calculating unit 20a calculates an area of the conductor layer formed of the resist 30b, the ground layer 30c, the power layer 30d, and the registry 30e in the printed-circuit board 30. Namely, the conductor-area calculating unit 20a calculates an area "D (m$^2$)" of a conductor including all the LSIs and the pattern 32 in the printed-circuit board 30 using the CAD data of the printed-circuit board stored in the board information DB 14.

Then, the component-area calculating unit 20b counts the number of via holes that each of the LSIs 31, 35, and 37 mounted on the printed-circuit board 30 has and the number of via holes connected to each of the LSIs 31, 35, and 37. In the case of the example illustrated in FIG. 3, the component-area calculating unit 20b counts and obtains 2 as the number of via holes connected to the LSI 31, 1 as the number of via holes connected to the LSI 35, and 6 as the number of via holes connected to the LSI 37.

Then, the component-area calculating unit 20b calculates an area of a predetermined range including an electronic component mounted on the printed-circuit board 30. In the case of the example illustrated in FIG. 3, as for the LSI 31, the component-area calculating unit 20b calculates an area of a range X illustrated in FIG. 5. As for the LSI 35, the component-area calculating unit 20b calculates an area of a range Y illustrated in FIG. 5. As for the LSI 37, the component-area calculating unit 20b calculates an area of a range Z illustrated in FIG. 5. Here, the component-area calculating unit 20b can be configured to receive specification of a range input by a user through the CAD data with each area calculation. In this case, by expressing the specified range in coordinates on the CAD data or the like, the component-area calculating unit 20b can calculate an area of the range. Furthermore, the component-area calculating unit 20b can store each electronic component and its specified range in the board information DB 14 in an associated manner in advance. In this case, by expressing the pre-specified range in coordinates on the CAD data or the like, the component-area calculating unit 20b can calculate an area of the range.

Then, the board physical-property-value calculating unit 20c calculates a copper-foil residual rate by dividing the total area "X+Y+Z" of the areas X, Y, and Z illustrated in FIG. 5 by the area "D (m$^2$)" of the conductor. Then, the board physical-property-value calculating unit 20c substitutes the calculated copper-foil residual rate into equation (1), and calculates an "equivalent thermal conductivity (conductor)" which is a physical property value of the conductor except for the areas X, Y, and Z.

Then, the component physical-property-value calculating unit 20d calculates respective physical property values corresponding to the LSIs 31, 35, and 37. Specifically, as for the LSI 31, the component physical-property-value calculating unit 20d substitutes "area=Y, number of via holes=2" into equation (2), and calculates a thermal conductivity Y as a physical property value corresponding to a predetermined range including the LSI 31. In the same way, as for the LSI 35, the component physical-property-value calculating unit 20d substitutes "area=Y, number of via holes=1" into equation (2), and calculates a thermal conductivity Y as a physical property value corresponding to a predetermined range including the LSI 35. Furthermore, as for the LSI 37, the component physical-property-value calculating unit 20d substitutes "area=Z, number of via holes=6" into equation (2), and calculates a thermal conductivity Z as a physical property value corresponding to a predetermined range including the LSI 37.

After that, the model generating unit 20e generates a thermal analysis model 40 subject to thermal analysis as illustrated in FIGS. 6 and 7. Specifically, as illustrated in FIG. 6, the model generating unit 20e generates a rectangular component 41 as a model of the LSI 31, a rectangular component 42 as a model of the LSI 35, and a rectangular component 43 as a model of the LSI 37.

Then, as illustrated in FIG. 6, as a heat release path of the area X including the LSI 31, i.e., the component 41, the model generating unit 20e provides a via hole 41a having the thermal conductivity X in the printed-circuit board 30 so as to extend from the center of the component 41 in the layer direction of the printed-circuit board 30. In the same way, as a heat release path of the area Y including the LSI 35, i.e., the component 42, the model generating unit 20e provides a via hole 42a having the thermal conductivity Y in the printed-circuit board 30 so as to extend from the center of the component 42 in the layer direction of the printed-circuit board 30. Furthermore, as a heat release path of the area Z including the LSI 37, i.e., the component 43, the model generating unit 20e provides a via hole 43a having the thermal conductivity Z in the printed-circuit board 30 so as to extend from the center of the component 43 in the layer direction of the printed-circuit board 30.

Then, the model generating unit 20e identifies a thermal conductivity corresponding to the LSI 31 from the physical property value DB 15, and sets the identified thermal conductivity as a physical property value of the component 41. In the same way, the model generating unit 20e identifies a thermal conductivity corresponding to the LSI 35 from the physical property value DB 15, and sets the identified thermal conductivity as a physical property value of the component 42. Furthermore, the model generating unit 20e identifies a thermal conductivity corresponding to the LSI 37 from the physical property value DB 15, and sets the identified thermal conductivity as a physical property value of the component 43. Moreover, the model generating unit 20e sets the "equivalent thermal conductivity (conductor)" in the conductor layer except for the components 41 to 43, and sets a physical property value of epoxy in the insulation layer 30a.

Furthermore, the model generating unit 20e moves the conductor layer that the printed-circuit board 30 has in a direction of the center of the printed-circuit board by a distance equal to the resist thickness. Specifically, as illustrated in FIG. 7, the model generating unit 20e moves the resist 30b, the ground layer 30c, the power layer 30d, and the registry 30e of the printed-circuit board 30 illustrated in FIG. 4 in the direction of the center by a distance equal to the thickness of the resist 30b. By performing the process described above, the model generating unit 20e can generate the thermal analysis model 40 illustrated in FIGS. 6 and 7. After that, the thermal analysis apparatus 10 performs thermal analysis on the thermal analysis model 40.

Flow of Processing

Figure 8:
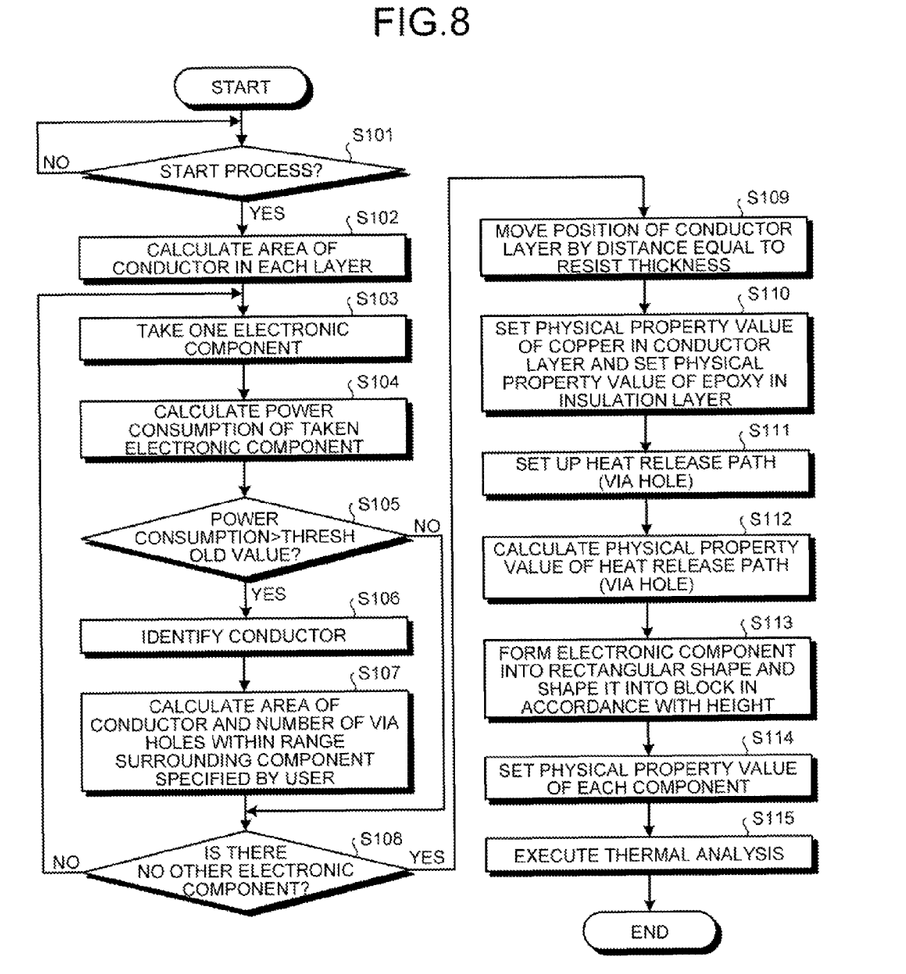
FIG. 8 is a flowchart illustrating a flow of a thermal analysis process.

Subsequently, a flow of processing by the thermal analysis apparatus according to the second embodiment is explained. FIG. 8 is a flowchart illustrating a flow of a thermal analysis process. Incidentally, the flow of the thermal analysis process is not limited to the order of steps illustrated in FIG. 8, and the order of processes can be shuffled.

As illustrated in FIG. 8, when the input unit 12 or the like receives an instruction to start the process (YES at Step S101), the conductor-area calculating unit 20a of the thermal analysis apparatus 10 calculates an area of a conductor in each layer (Step S102).

Then, the component-area calculating unit 20b takes one electronic component mounted on the printed-circuit board 30 subject to thermal analysis and calculates power consumption of the electronic component (Steps S103 and S104), and determines whether the calculated power consumption is greater than a threshold value (Step S105). Incidentally, data on power consumption of each electronic component can be stored in a predetermined storage unit in advance. Furthermore, the power consumption can be calculated by a known technique using information on specifications, also referred to as data sheets, of the electronic components mounted on the printed-circuit board 30.

Then, when the power consumption of the taken electronic component is greater than the threshold value (YES at Step S105), the component-area calculating unit 20b obtains a pattern, a land, and via hole(s) from information on a power network or ground network having a component pin connected to the electronic component (Step S106). Namely, the component-area calculating unit 20b identifies other conductors connected to the electronic component.

Then, the component-area calculating unit 20b calculates an area of a range including the electronic component and the conductors, which is specified by a user, and counts the number of via holes included in the range (Step S107).

After that, the component-area calculating unit 20b determines whether there is no other electronic component mounted on the printed-circuit board 30 (Step S108). When there are any other electronic components (NO at Step S108), the flow returns to Step S103 and the above processes are performed on the electronic components.

On the other hand, when the component-area calculating unit 20b determines that there is no other electronic component mounted on the printed-circuit board (YES at Step S108), the flow proceeds to Step S109. Namely, the model generating unit 20e moves the position of the conductor layer in the printed-circuit board 30 to the center of the printed-circuit board by a distance equal to the resist thickness. That is, the model generating unit 20e moves each layer in the direction from the front surface to the center or from the back surface to the center of the printed-circuit board by a distance equal to the resist thickness. In other words, the model generating unit 20e moves each layer to the center of the printed-circuit board by a distance equal to the resist thickness in a direction perpendicular to each layer of the printed-circuit board.

Then, the board physical-property-value calculating unit 20c sets a physical property value of copper in the conductor layer of the printed-circuit board 30, and sets a physical property value of epoxy in the insulation layer (Step S110). Namely, as for the conductor in the printed-circuit board except for the area calculated at Steps S103 to S107, the board physical-property-value calculating unit 20c calculates a physical property value by equation (1) and sets the calculated physical property value.

Then, the model generating unit 20e provides, as a heat release path, a via hole so as to extend from the center of the electronic component on the printed-circuit board in the layer direction (Step S111). Then, the component physical-property-value calculating unit 20d calculates a physical property value to be set in each via hole provided as a heat release path by using equation (2), and the model generating unit 20e sets the calculated physical property value (Step S112).

Then, the model generating unit 20e forms each electronic component into a rectangular shape and shapes it into a block in accordance with the height (Step S113). Furthermore, the model generating unit 20e identifies a pre-specified physical property value from the physical property value DB 15 and sets the identified physical property value in the block-shaped electronic component, and generates the thermal analysis model 40 (Step S114). After that, the analysis executing unit 20f performs thermal analysis on the thermal analysis model 40 generated at Steps S101 to S114 (Step S115).

Effect of Second Embodiment

The thermal analysis apparatus 10 according to the second embodiment calculates an area of a predetermined range including an electronic component mounted on the printed-circuit board, and counts the number of via holes included in the predetermined range of which the area is calculated. Then, the thermal analysis apparatus 10 calculates a first physical property value using the calculated area, the number of via holes counted, and a preset physical property value of a conductor. Furthermore, the thermal analysis apparatus 10 generates a thermal analysis model subject to thermal analysis in which a physical property value preset with respect to the electronic component is set and a heat release path having the calculated first physical property value is provided in the printed-circuit board so as to extend from the electronic component in the layer direction of the printed-circuit board.

As a result, the thermal analysis apparatus 10 can improve the accuracy of thermal analysis. Furthermore, unlike the conventional technologies, it does not divide the printed-circuit board into grids; therefore, it is possible to reduce the scale of the thermal analysis model and also possible to shorten an analysis time.

Furthermore, the thermal analysis apparatus 10 calculates an area of a conductor in the printed-circuit board. Then, the thermal analysis apparatus 10 calculates a second physical property value using a ratio of an area obtained by excluding the area of the predetermined range including the electronic component from the calculated area of the conductor in the printed-circuit board and the preset physical property value of the conductor. Then, the thermal analysis apparatus 10 generates the thermal analysis model in which the second physical property value is further set with respect to a conductor other than the electronic component in the printed-circuit board and the preset physical property value is further set with respect to an insulation layer in the printed-circuit board.

As a result, the thermal analysis apparatus 10 can generate a thermal analysis model close to the actual printed-circuit board, and therefore can accurately analyze a state of heat released from the electronic component which is a heat generating component. Consequently, it is possible to further improve the accuracy of thermal analysis.

Furthermore, with respect to each electronic component mounted on the printed-circuit board, the thermal analysis apparatus 10 calculates an area of a predetermined range including each electronic component, and counts the number of via holes included in the predetermined range of which area is calculated. Then, with respect to each electronic component, the thermal analysis apparatus 10 calculates a first physical property value using the calculated area, the number of via holes counted, and the preset physical property value of the conductor. Then, the thermal analysis apparatus 10 calculates a second physical property value using a ratio of an area obtained by excluding the total area of the calculated predetermined ranges of the electronic components from the calculated area of the conductor in the printed-circuit board and the preset physical property value of the conductor. Then, the thermal analysis apparatus 10 sets the second physical property value with respect to a conductor other than the electronic components in the printed-circuit board, and sets a corresponding physical property value specified to each electronic component with respect to each electronic component. Then, the thermal analysis apparatus 10 generates a thermal analysis model in which a heat release path having the first physical property value is provided in the printed-circuit board so as to extend from each electronic component in the layer direction of the printed-circuit board.

As a result, the thermal analysis apparatus 10 can calculate a physical property value with respect to each electronic component which is a heat generating component, and can generate a thermal analysis model in which a heat release path is set with respect to each electronic component. Therefore, the thermal analysis apparatus 10 can obtain information on a state of heat released from each electronic component through thermal analysis, and can further improve the accuracy of thermal analysis.

Furthermore, the thermal analysis apparatus 10 calculates an area of a predetermined range including an electronic component of which the power consumption is higher than a predetermined value out of the electronic components mounted on the printed-circuit board. As a result, the thermal analysis apparatus 10 can omit to set a heat release path with respect to an electronic component of which the amount of heat generation is low enough to be overlooked in a thermal analysis process; therefore, it is possible to shorten a time to generate a thermal analysis model and a thermal analysis processing time.

Moreover, the thermal analysis apparatus 10 generates a thermal analysis model in which a heat release path having a first physical property value is provided in the printed-circuit board so as to extend from the center of an electronic component in the layer direction of the printed-circuit board. As a result, the thermal analysis apparatus 10 can accurately analyze a state of heat released from the electronic component. Furthermore, the thermal analysis apparatus 10 uses a via hole that the printed-circuit board has as a heat release path. As a result, the thermal analysis apparatus 10 can generate a thermal analysis model closer to the printed-circuit board subject to thermal analysis.

Moreover, the thermal analysis apparatus 10 moves the position of a conductor layer in the printed-circuit board in the direction of the center of the printed-circuit board by a distance equal to the resist thickness. As a result, the thermal analysis apparatus 10 can prevent heat released from an electronic component from being spread over the surface on which the electronic component is mounted, so the heat released from the electronic component can be accurately released into the printed-circuit board. Therefore, it is possible to reduce the error of electronic component surface temperature and also possible to further improve the accuracy of thermal analysis.

[c] Third Embodiment

The first and second embodiments are explained above; other than the above embodiments, the present invention can be embodied in various different forms. A different embodiment is explained below.

Via Hole to be Modeled

The above-described thermal-analysis-model generating apparatus or thermal analysis apparatus can set various via holes as heat release paths. For example, the thermal-analysis-model generating apparatus or thermal analysis apparatus can use a via hole of the same size (length×width×height) as a via hole used in a printed-circuit board. Furthermore, if a plurality of via holes is used in the printed-circuit board, the thermal-analysis-model generating apparatus or thermal analysis apparatus can set a via hole of the same size as an arbitrary via hole in the via holes, or can set a via hole of the same size as the most commonly-used via hole in the via holes. As a result, it is possible to model the via hole in a state close to that is in the printed-circuit board subject to modeling and also possible to improve the accuracy of thermal analysis.

Number of Via Holes to be Modeled

In the second embodiment, there is described an example where one via hole is set with respect to each electronic component; however, the number of via holes is not limited to one, and the number and positions of via holes to be set can be changed depending on the shape or power consumption of the electronic component.

Figure 9:
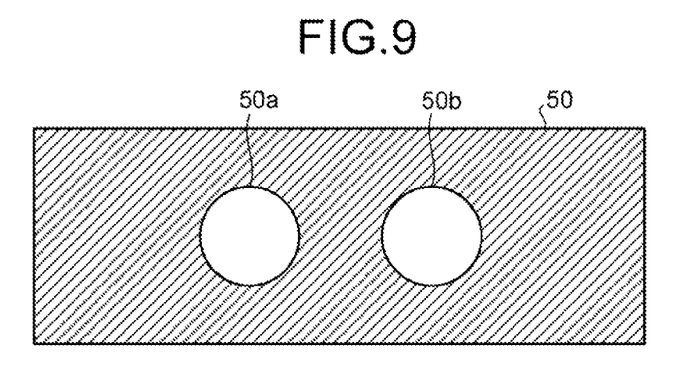
FIG. 9 is a diagram illustrating an example of an electronic component in which two via holes are provided in a thermal analysis model.

For example, when a ratio between width and height of the electronic component is greater than a predetermined value or when the width of the electronic component is greater than a predetermined value, a plurality of via holes can be provided. A concrete example is explained with reference to an electronic component illustrated in FIG. 9. FIG. 9 is a diagram illustrating an example of an electronic component in which two via holes are provided in a thermal analysis model.

An electronic component 50 illustrated in FIG. 9 is "a (mm)" wide and "b (mm)" high, and a ratio between a and b is "a:b=2.2:1". In this case, the width a is more than twice the height b, so the thermal analysis apparatus sets up two via holes 50*a* and 50*b* as illustrated in FIG. 9. Namely, it is possible to generate a thermal analysis model in which a heat release path having a physical property value is provided in the printed-circuit board so as to extend from the position identified by the shape of the electronic component in the layer direction of the printed-circuit board. As a result, a heat release path can be provided at the appropriate position in each electronic component, leading to improvement of analysis accuracy.

Figure 10:
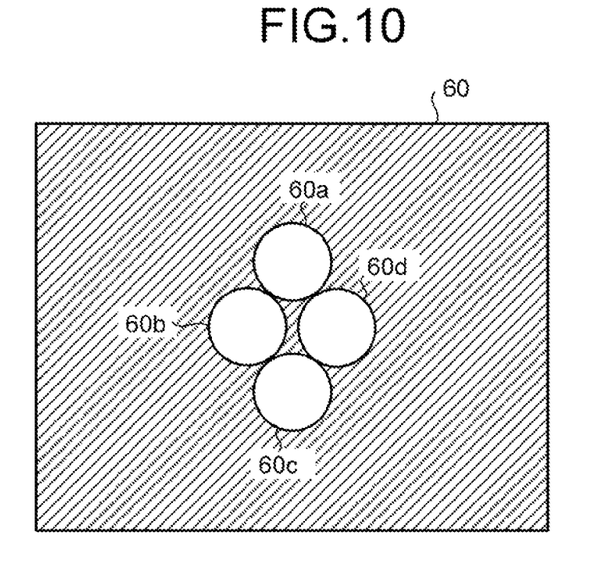
FIG. 10 is a diagram illustrating an example of an electronic component in which four via holes are provided in a thermal analysis model.

As another example, when power consumption of the electronic component is higher than a predetermined value, a plurality of via holes can be provided. A concrete example is explained with reference to an electronic component illustrated in FIG. 10. FIG. 10 is a diagram illustrating an example of an electronic component in which four via holes are provided in a thermal analysis model.

It is assumed that power consumption of an electronic component 60 illustrated in FIG. 10 is "210 (W)" and a threshold value is "50 (W)". In this case, the power consumption of the electronic component 60 is more than four times the threshold value, so the thermal analysis apparatus sets up four via holes 60*a*, 60*b*, 60*c*, and 60*d* as illustrated in FIG. 10. Incidentally, the number of via holes and a set value of the via holes are not limited to those illustrated in FIG. 10, and can be arbitrarily set. Furthermore, the thermal analysis apparatus can use a combination of the via holes illustrated in FIGS. 9 and 10. Namely, it is possible to generate a thermal analysis model in which as many heat release paths having a physical property value as identified by power consumption of an electronic component are provided in the printed-circuit board so as to extend from the electronic component in the layer direction of the printed-circuit board. As a result, heat release paths based on power consumption of each electronic component can be set, leading to improvement of analysis accuracy.

Setup Position of Modeled Via Hole

In the second embodiment, there is described an example where a via hole is set in the center of each electronic component; however, the setup position of a via hole is not limited to this. For example, when an electronic component is divided into a heat generating part and a non-heat generating part, the thermal analysis apparatus can set a via hole not in the center of the electronic component but in the center of the heat generating part. Namely, the setup position of a via hole can be arbitrarily changed depending on the shape, power consumption, or configuration of the electronic component.

Physical Property Value of Conductor

In the second embodiment, there is described an example where a physical property value of a conductor other than electronic components is calculated by using equation (1); however, it is not limited to this. For example, a pre-specified physical property value, such as a thermal conductivity of copper, can be used. Furthermore, when thermal analysis is performed on the same printed-circuit board several times, a previous physical property value can be used with respect to the conductor other than electronic components. Moreover, in the second embodiment, there is described an example where a thermal conductivity of copper is used in equation (1) or (2); however, it is not limited to this, and, for example, thermal conductivities of other elements, such as aluminum, can be used.

Board Information

In the second embodiment, there is described an example where data on a printed-circuit board is stored in the board information DB and a thermal analysis model is generated by obtaining various information from the board information DB; however, it is not limited to this. For example, when the thermal analysis apparatus described in the second embodiment has a CAD function or the like, the CAD data described in the second embodiment can be generated from the actual printed-circuit board. Furthermore, the thermal analysis apparatus can be configured to receive the CAD data described in the second embodiment from an operator or other devices.

System

Out of the processes described in the present embodiments, all or part of the process described as the one that is automatically performed can be manually performed. In addition, the processing procedures, control procedures, specific names, and information including various data and parameters, such as those illustrated in FIGS. 3 to 7, illustrated in the above description and the drawings can be arbitrarily changed unless otherwise specified.

Furthermore, the elements of the apparatuses illustrated in the drawings are functionally conceptual ones, and do not always have to be physically configured as illustrated in the drawings. Namely, specific forms of dispersion and integration of the elements in the apparatuses are not limited to those illustrated in the drawings. All or part of the elements can be configured to be functionally or physically dispersed or integrated in arbitrary units depending on respective loads or use conditions, for example, in such a manner that the conductor-area calculating unit 20*a* and the component-area calculating unit 20*b* can be integrated into one unit. Moreover, all or any part of processing functions for the processes performed in the apparatuses can be realized by a CPU and a program analyzed and executed by the CPU.

Program

Incidentally, the various processes described in the above embodiments can be realized by causing a computer system, such as a personal computer or a workstation, to execute a program prepared in advance. An example of the computer system which executes a program having the same function as that is described in the above embodiments is explained below.

Figure 11:
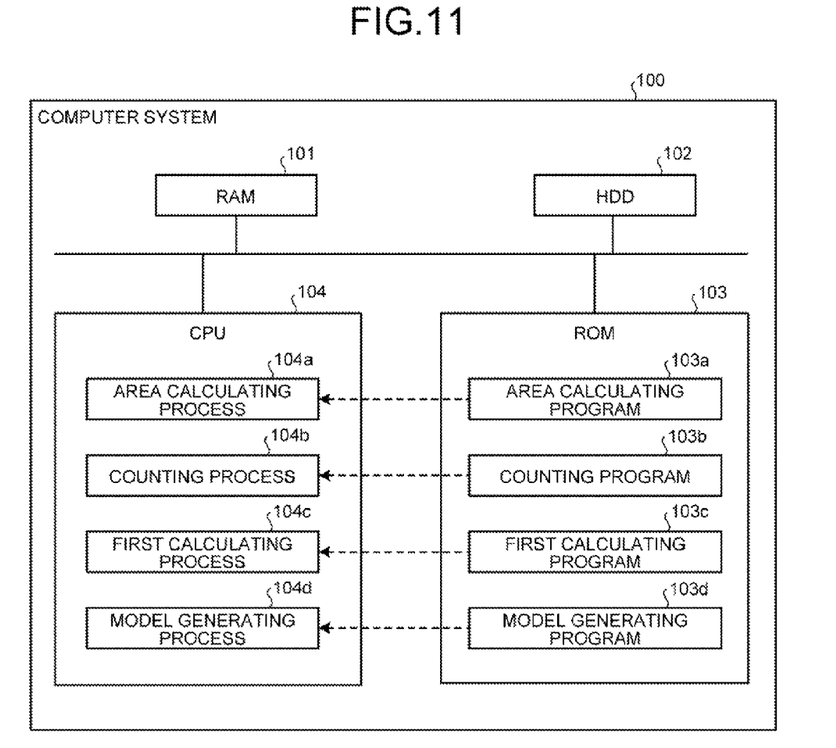
FIG. 11 is a diagram illustrating an example of a computer system which executes a thermal-analysis-model generating program.

FIG. 11 is a diagram illustrating an example of a computer system which executes a thermal-analysis-model generating program. As illustrated in FIG. 11, a computer system 100 includes a RAM 101, an HDD 102, a ROM 103, and a CPU 104. In the ROM 103, programs for fulfilling the same functions as those described in the above embodiments are stored in advance. Namely, as illustrated in FIG. 11, an area calculating program 103*a*, a counting program 103*b*, a first calculating program 103*c*, and a model generating program 103*d* are stored in the ROM 103 in advance.

The CPU 104 reads and executes these programs 103*a* to 103*d*, thereby the programs 103*a* to 103*d* cause the CPU 104 to perform an area calculating process 104*a*, a counting process 104*b*, a first calculating process 104*c*, and a model generating process 104*d*, respectively, as illustrated in FIG. 11.

Incidentally, the area calculating process 104*a* corresponds to the area calculating unit 1*a* illustrated in FIG. 1; the counting process 104*b* corresponds to the counting unit 1*b*; the first calculating process 104*c* corresponds to the first calculating unit 1*c*; the model generating process 104*d* corresponds to the model generating unit 1*d*. In the HDD 102, various information used to execute the processes is stored.

The above programs 103a to 103d do not necessarily have to be stored in the ROM 103. For example, the programs 103a to 103d can be stored in a "portable physical medium" to be inserted into the computer system 100, such as a flexible disk (FD), a CD-ROM, a DVD, a magneto optical disk, or an IC card. Furthermore, the programs 103a to 103d can be stored in a "fixed physical medium" installed inside or outside the computer system 100, such as a hard disk drive (HDD). Moreover, the programs 103a to 103d can be stored in "another computer system" connected to the computer system 100 via a network, such as a public line, the Internet, a LAN, or a WAN. Then, the computer system 100 can be configured to read out the programs from these.

Namely, the programs according to the different embodiment are recorded on a computer-readable recording medium, such as the "portable physical medium", the "fixed physical medium", or a "communication medium". Then, the computer system 100 reads out the programs from such a medium and executes the read programs, thereby realizing the same functions as those described in the above embodiments. Incidentally, the programs according to the different embodiment do not necessarily have to be executed by the computer system 100. For example, the present invention can be also similarly applied to a case where another computer system or a server executes the programs or a case where another computer system and a server execute the programs in cooperation with each other.

According to an aspect of a thermal-analysis-model generating apparatus, a thermal-analysis-model generating program, a thermal-analysis-model generating method, and a thermal analysis apparatus disclosed in the present application, it is possible to improve the accuracy of thermal analysis.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A thermal-analysis-model generating apparatus comprising:
   an area calculating unit that calculates an area of a predetermined range including an electronic component mounted on a printed-circuit board, the area including both the electronic component and the printed-circuit board;
   a counting unit that counts a number of via holes included in the predetermined range of which the area is calculated by the area calculating unit;
   a first calculating unit that calculates a first physical property value using the area calculated by the area calculating unit, the number of via holes counted by the counting unit, and a preset physical property value of a conductor;
   a conductor calculating unit that calculates an area of the conductor in the printed-circuit board;
   a second calculating unit that calculates a second physical property value using a ratio of an area obtained by excluding the area calculated by the area calculating unit from the area of the conductor calculated by the conductor calculating unit in the printed-circuit board and the preset physical property value of the conductor; and
   a model generating unit that generates a thermal analysis model subject to thermal analysis in which a preset physical property value is set in the electronic component, a heat release path having the first physical property value calculated by the first calculating unit is provided in the printed-circuit board so as to extend from the electronic component in a layer direction of the printed-circuit board, the second physical property value calculated by the second calculating unit is further set in the conductor other than the electronic component in the Printed-circuit board and a preset physical property value is further set in an insulator in the printed-circuit board.

2. The thermal-analysis-model generating apparatus according to claim 1, wherein
   with respect to each of electronic components mounted on the printed-circuit board, the area calculating unit calculates an area of a predetermined range including each electronic component,
   with respect to each of the predetermined ranges of which the respective areas are calculated by the area calculating unit, the counting unit counts the number of via holes included in each predetermined range,
   with respect to each of the electronic components, the first calculating unit calculates a first physical property value using the area calculated by the area calculating unit, the number of via holes counted by the counting unit, and the preset physical property value of the conductor,
   the second calculating unit calculates the second physical property value using a ratio of an area obtained by excluding the total area of the areas calculated by the area calculating unit from the area of the conductor calculated by the conductor calculating unit in the printed-circuit board and the preset physical property value of the conductor, and
   the model generating unit generates the thermal analysis model in which the second physical property value is set in the conductor other than the electronic components in the printed-circuit board, respective preset physical property values are set in the electronic components, and a heat release path having the corresponding first physical property value is provided in the printed-circuit board so as to extend from each of electronic components in the layer direction of the printed-circuit board.

3. The thermal-analysis-model generating apparatus according to claim 1, wherein the area calculating unit calculates an area of a predetermined range including an electronic component of which the power consumption is higher than a predetermined value out of the electronic components mounted on the printed-circuit board.

4. The thermal-analysis-model generating apparatus according to claim 1, wherein the model generating unit generates the thermal analysis model in which a heat release path having the first physical property value is provided in the printed-circuit board so as to extend from the center of the electronic component in the layer direction of the printed-circuit board.

5. The thermal-analysis-model generating apparatus according to claim 1, wherein the model generating unit generates the thermal analysis model in which a heat release path having the first physical property value is provided in the printed-circuit board so as to extend from the position of the electronic component identified by the shape of the electronic component in the layer direction of the printed-circuit board.

6. The thermal-analysis-model generating apparatus according to claim 1, wherein the model generating unit generates the thermal analysis model in which as many heat release paths having the first physical property value as identified by power consumption of the electronic component are provided in the printed-circuit board so as to extend from the electronic component in the layer direction of the printed-circuit board.

7. The thermal-analysis-model generating apparatus according to claim 1, wherein the model generating unit moves the position of a conductor layer in the printed-circuit board in a direction of the center of the printed-circuit board by a distance equal to a resist thickness.

8. The thermal-analysis-model generating apparatus according to claim 1, wherein the model generating unit uses a via hole that the printed-circuit board has as the heat release path.

9. A thermal analysis apparatus comprising:
an area calculating unit that calculates an area of a predetermined range including an electronic component mounted on a printed-circuit board, the area including both the electronic component and the printed-circuit board;
a counting unit that counts a number of via holes included in the predetermined range of which the area is calculated by the area calculating unit;
a first calculating unit that calculates a first physical property value using the area calculated by the area calculating unit, the number of via holes counted by the counting unit, and a preset physical property value of a conductor;
a conductor calculating unit that calculates an area of the conductor in the printed-circuit board;
a second calculating unit that calculates a second physical property value using a ratio of an area obtained by excluding the area calculated by the area calculating unit from the area of the conductor calculated by the conductor calculating unit in the printed-circuit board and the preset physical property value of the conductor;
a model generating unit that generates a thermal analysis model subject to thermal analysis in which a preset physical property value is set in the electronic component, a heat release path having the first physical property value calculated by the first calculating unit is provided in the printed-circuit board so as to extend from the electronic component in a layer direction of the printed-circuit board, the second physical property value calculated by the second calculating unit is further set in the conductor other than the electronic component in the printed-circuit board and a preset physical property value is further set in an insulator in the printed-circuit board; and
an executing unit that executes the thermal analysis on the thermal analysis model generated by the model generating unit.

10. A thermal-analysis-model generating method executed by a computer, the method comprising:
calculating, by using the computer, an area of a predetermined range including an electronic component mounted on a printed-circuit board, the area including both the electronic component and the printed-circuit board;
counting, by using the computer, a number of via holes included in the predetermined range of which the area is calculated;
calculating, by using the computer, a first physical property value using the calculated area, the number of via holes counted, and a preset physical property value of a conductor;
calculating, by using the computer, an area of the conductor in the printed-circuit board;
calculating, by using the computer, a second physical property value using a ratio of an area obtained by excluding the calculated area including both the electronic component and the printed-circuit board from the calculated area of the conductor in the printed-circuit board and the preset physical property value of the conductor; and
generating, by using the computer, a thermal analysis model subject to thermal analysis in which a preset physical property value is set in the electronic component, a heat release path having the calculated first physical property value is provided in the printed-circuit board so as to extend from the electronic component in a layer direction of the printed-circuit board, the calculated second Physical property value is further set in the conductor other than the electronic component in the printed-circuit board and a preset physical property value is further set in an insulator in the printed-circuit board.

11. A non-transitory computer-readable storage medium storing a program for generating a thermal-analysis-model, the program causing a computer to execute:
calculating an area of a predetermined range including an electronic component mounted on a printed-circuit board, the area including both the electronic component and the printed-circuit board;
counting a number of via holes included in the predetermined range of which the area is calculated;
calculating a first physical property value using the calculated area, the number of via holes counted, and a preset physical property value of a conductor;
calculating an area of the conductor in the printed-circuit board;
calculating a second physical property value using a ratio of an area obtained by excluding the calculated area including both the electronic component and the printed-circuit board from the calculated area of the conductor in the printed-circuit board and the preset physical property value of the conductor; and
generating a thermal analysis model subject to thermal analysis in which a preset physical property value is set in the electronic component, a heat release path having the calculated first physical property value is provided in the printed-circuit board so as to extend from the electronic component in a layer direction of the printed-circuit board, the calculated second physical property value is further set in the conductor other than the electronic component in the printed-circuit board and a preset physical property value is further set in an insulator in the printed-circuit board.

* * * * *